United States Patent [19]

Quant

[11] Patent Number: 4,609,322

[45] Date of Patent: Sep. 2, 1986

[54] MOUNTING FOR A LINKAGE ARRANGEMENT

[75] Inventor: Wilton E. Quant, Bristol, Ill.

[73] Assignee: Caterpillar Tractor Co., Peoria, Ill.

[21] Appl. No.: 640,278

[22] Filed: Aug. 13, 1984

[51] Int. Cl.⁴ ............................................. B66C 23/00
[52] U.S. Cl. ..................................... 414/685; 172/501; 172/484; 414/727; 414/697
[58] Field of Search ............... 414/697, 700, 701, 727, 414/722, 715, 685, 917; 172/484, 307, 501; 74/526, 521

[56] References Cited

U.S. PATENT DOCUMENTS

| | | |
|---|---|---|
| 3,964,799 | 6/1976 | Knapp . |
| 4,022,536 | 5/1977 | Piepho et al. ........................ 403/16 |
| 4,400,898 | 8/1983 | Christensen et al. ................. 37/118 |
| 4,431,364 | 2/1984 | Redenbarger et al. ............. 414/697 |

FOREIGN PATENT DOCUMENTS

| | | |
|---|---|---|
| 3132575 | 3/1983 | Fed. Rep. of Germany . |
| 2262752 | 9/1975 | France . |

Primary Examiner—Leslie J. Paperner
Assistant Examiner—Dennis Williamson
Attorney, Agent, or Firm—William C. Perry

[57] ABSTRACT

Earthmoving vehicles are often provided with a linkage arrangement on one end that is utilized to manipulate a work implement, such as a loader bucket. The linkage typically includes a tilting arrangment for the bucket that incorporates a tilt lever that is mounted to a lift arm that supports the bucket. The mounting between the tilt lever and the lift arm is normally of a complex nature requiring multiple bearing surfaces and lubrication means. Others may have a structure that requires exact positioning between the relative components or a failure will occur due to improper loading. The linkage arrangement of the present invention provides a mounting member that is attached to only one of the tilt levers. It also includes an axial motion limiter that is attached to the other tilt lever. In doing so, a very simple and economical mounting device is provided. The mounting device also allows the tilt levers to rotate with respect to each other so that each of the levers function to bear a portion of the loading.

15 Claims, 3 Drawing Figures

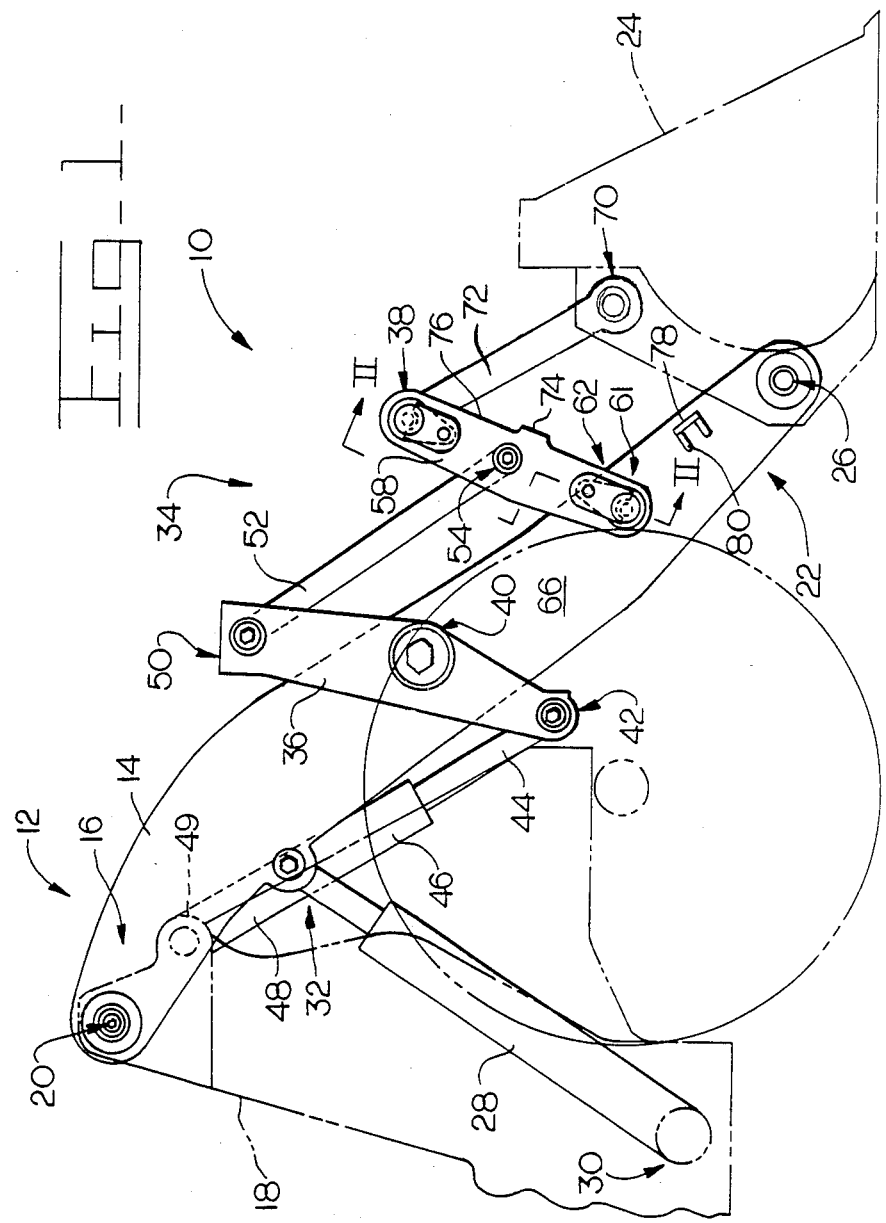

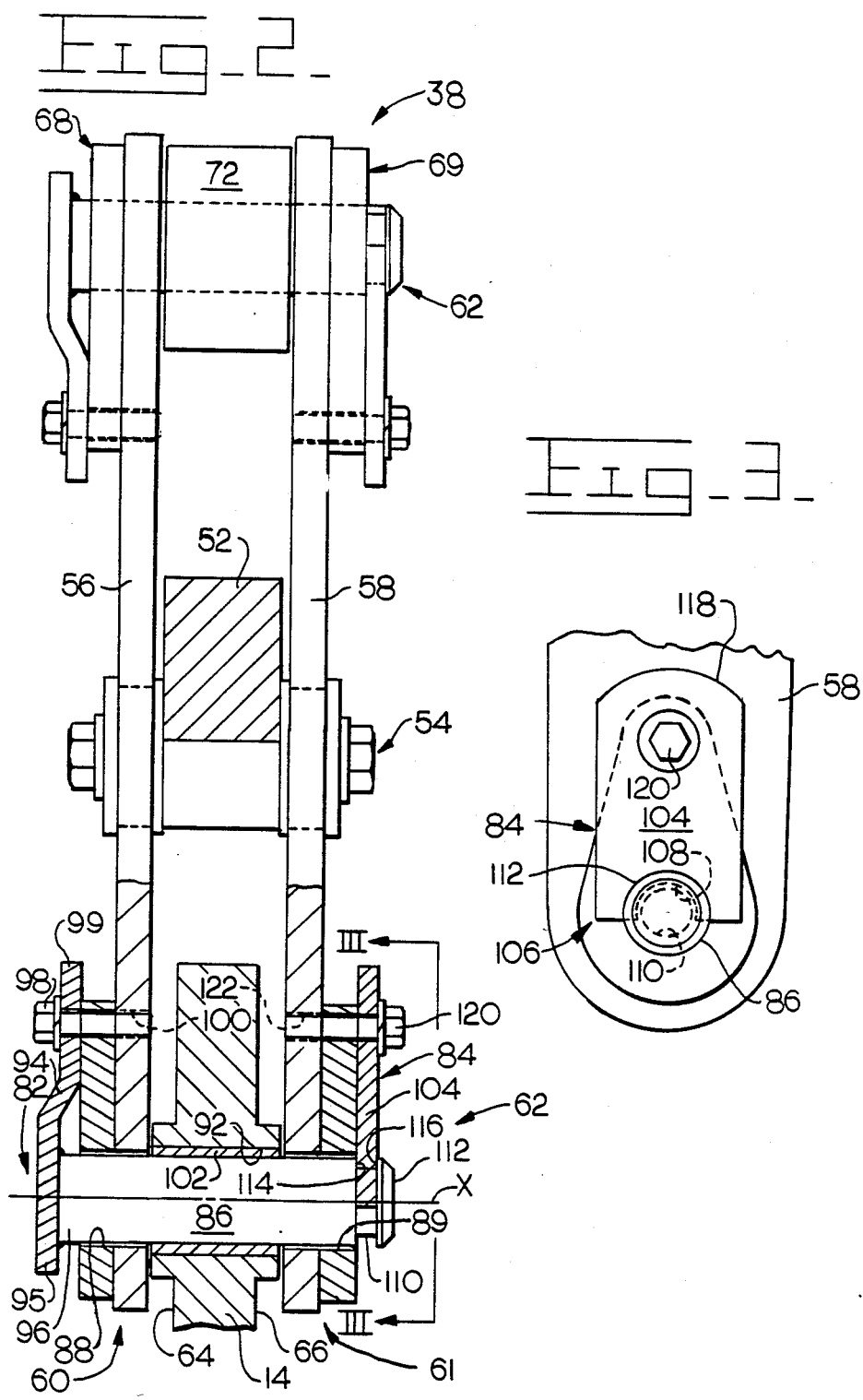

MOUNTING FOR A LINKAGE ARRANGEMENT

DESCRIPTION

1. Technical Field

This invention relates generally to the mounting between the components of a linkage arrangement and more particularly to the mounting between the tilt levers and the lift arms of a loader linkage of an earthmoving vehicle.

2. Background Art

In a construction vehicle, such as a wheel or a track-type loader for example, a loader linkage is provided that typically consists of a pair of lift arms that extend from the front end of the vehicle and mount a work implement, such as a bucket. The vehicle usually loads the bucket with material such as dirt and then dumps the material into a truck for removal from the work site. In order to empty the material from the bucket into the truck, a tilting apparatus is incorporated into the loader linkage. The tilting apparatus consists of at least one lever that extends upwardly from each lift arm. The upper portion of each lever is in turn connected to the upper portion of the bucket by a tilt link. A hydraulic cylinder is provided that has one end connected to the tilt lever and its other end connected to the vehicle frame. The cylinder may be directly connected to the tilt lever or it may be connected through another tilt lever and link arrangement. When actuated, the hydraulic cylinder rotates the levers forward until a portion of the levers come into contact with a stop member that is located on each side of the respective lift arms. When the tilt levers are moved to this position, the bucket, through its connection with the levers, is rotated about its connection to the lift arms and the material held within the bucket is dumped out.

While a linkage apparatus of this type has proven to be extremely reliable over the years, improvements in the componentry are always desirable. One such area that has been improved upon is the structure of the tilt levers and their mounting to the lift arms. Due to the large capacity of the buckets utilized by loaders, the weight of the material and the force from the tilt cylinder apply a very substantial force to the tilt apparatus and particularly to the tilt lever when they are brought into contact with the dump stops on the lift arm. Because of this it has been common practice to form the tilt levers from a casting or fabrication that is large enough to accept the loading. The tilt levers typically have a one-piece body that has two bifurcated projections that straddle the lift arm. A pin that is secured to one of the projections extends through the lift arm and both of the projections of each tilt lever to rotatably connect the two members together. A flat surface must be provided at a forward portion of the tilt levers that will engage the dump stops on the lift arms to limit the travel of the tilt levers. To properly transfer the loads through the tilt levers, it is important that the surface of each tilt lever engage the dump stop on both sides of the lift arm. However, during fabrication, machining or assembly of the components, a stack-up of tolerances may occur and create a situation wherein only one side of a tilt lever engages a dump stop. Since the lever is a one-piece casting or fabrication, just one side of the lever will be caused to carry the majority of the load, thus imparting a twist in the tilt lever during normal operation. This may result in premature failure of the linkage.

Another lift arm/tilt lever configuration utilizes two tilt levers that are positioned on each side of each of the lift arms and are retained together by a pin that has a retainer associated with each of the tilt levers. The pin is not connected to either of the tilt levers but is free to rotate within the bores in the tilt levers and lift arm. An arrangement of this configuration, however, requires the provision of two retainers, hardened bearing surfaces in all of the components and the required provisions for lubrication of all of the bearing surfaces. This greatly increases the cost of the linkage as well as the time required to maintain it.

The present invention is directed to overcoming one or more of the problems as set forth above.

DISCLOSURE OF THE INVENTION

In one aspect of the present invention, a linkage apparatus is provided between a first member having a bore defined therein along an axis, and a second member having a first end portion that also has a bore defined therein and a second end portion. The second member is positioned adjacent a first side of the first member with the bores of the two members being in axial alignment with each other. A third member having a first end portion that has a bore defined therein and a second end portion is positioned adjacent a second side of the first member with its bore in axial alignment with the bore of the first member. A means for mounting the first, second, and third members together for relative rotation with respect to each other is provided. The mounting means is connected to the second member. A means for limiting the axial movement of the first, second, and third members is provided, with the limiting means being connected between the third member and the mounting means.

With a linkage arrangement as set forth above, a very simple and economical mounting apparatus may be utilized that mounts the components for relative rotation with respect to each other while also providing a limiting means for axial movement between the components. A mounting arrangement such as this allows the tilt levers to rotate relative to each other about their mounting with the lift arm. In doing so, each tilt lever will fully engage the dump stops on the lift arm to insure proper loading of the tilt levers.

BRIEF DESCRIPTION OF THE DRAWINGS

FIG. 1 is a fragmentary side view of a front end loader that discloses a loader linkage that embodies the principles of the present invention.

FIG. 2 is a fragmentary sectional view taken along lines II—II of FIG. 1.

FIG. 3 is a fragmentary sectional view taken along lines III—III of FIG. 2.

BEST MODE FOR CARRYING OUT THE INVENTION

Referring to the drawings, FIG. 1 discloses a linkage arrangement 10 for a loader-type vehicle 12. The linkage arrangement includes a pair of elongated lift arms 14 (one shown) that have a first end portion 16 rotatably connected to a frame 18 of the vehicle 12 by a pin arrangement 20. A second end portion 22 of the lift arms 14 support a work implement such as a bucket 24, also by a pin arrangement 26 or other suitable mounting means that allows the bucket to rotate with respect to the lift arms 14. The lift arms 14 and bucket 24 are vertically movable with respect to the vehicle in response to the actuation of a hydraulic lift cylinder 28 that is connected at one end 30 to the vehicle frame 18 and at its other end 32 to the lift arms 14.

A tilting apparatus shown generally at 34 is also included in the loader linkage arrangement 10. The tilting apparatus 34 includes a pair of power levers 36 (one shown) and a pair of tilt lever assemblies 38 (one shown) that are pivotally mounted to each of the lift arms 14. The power levers 36 are rotatably mounted to the lift arms 14 at a location 40 intermediate its end portions. A first end portion 42 of the power lever 36 is connected to a rod end 44 of a hydraulic tilt cylinder 46. The head end 48 of the cylinder 46 is connected to the vehicle frame 18 at a location shown generally at 49. A second end 50 of the power lever 36 is interconnected with the tilt lever assemblies 38 by a pair of power links 52 (one shown) at an intermediate portion 54 of the tilt lever assemblies 38. Each tilt lever assembly includes first and second elongated lever members 56 and 58. As best shown in FIG. 2, each lever 56 and 58 has a first end portion 60 and 61, respectively, that is rotatably mounted to the lift arms 14 by a common mounting device shown generally at 62 that will be described in greater detail hereinafter. The first tilt lever 56 is positioned on a first side 64 of the lift arm 14 while the second tilt lever 58 is positioned on a second, or opposite side 66 of the lift arm. A second end portion 68 and 69 of the respective tilt levers 56 and 58 is connected to an upper portion 70 of the bucket 24 by a pair of tilt links 72 (one shown). A flat portion 74 is machined or otherwise accurately located on a forward edge 76 of the tilt levers 56 and 58. The flat portion 74 is positioned to engage a surface 78 of a mechanical stop member 80 that forms a portion of lift arm 14. While this particular tilting apparatus 34 includes a pair of power levers 36 and power links 52, it may be desirable to eliminate these components and connect the tilt cylinder 46 directly between the tilt lever assemblies 38 and the lift arms 14.

The mounting apparatus 62, shown best in FIGS. 2 and 3, consists of a rotational securing means 82 and an axial movement limitation portion 84. The rotational securing means 82 consists of a pin member 86 that extends through a pair of bores 88 and 89 defined in the respective first end portions 60 and 61 of each of the tilt levers 56 and 58 and a bearing bore 92 defined in the lift arm 14. All of the bores are positioned along a common axis X that is transverse to the lift arm 14. A flange member 94 has a first end portion 95 fixedly attached, as by welding, to a first end portion 96 of the pin 86. The flange member 94 extends upwardly from the pin 86 in a direction normal to axis X, to a position adjacent the first tilt lever 56. A threaded fastening member 98, such as a bolt, extends through a second end portion 99 of the flange member 94 and is received in threaded aperture 100 provided in the first tilt lever 56. A bearing member 102 is positioned between the pin 86 and the bore 92 of the lift arm 14 to allow relative rotation therebetween.

Axial movement of the pin 86 and thus the axial movement between the first and second tilt levers 56 and 58 and the lift arm 14 is controlled by a plate member 104. As best shown in FIG. 3, the plate member 104 extends in a direction normal to axis X to a location adjacent the second tilt lever 58. The plate member 104 has a first end portion 106 that defines a concave or semicircular indentation 108. The first end portion 106 is sufficiently configured to engage a groove 110 that is defined in a second end portion 112 of the pin 86. The indentation 108 is positioned about the pin in close proximity to the base of the groove 110 which has a reduced diameter. The outside diameter of the pin is large enough to contact the plate member 104 with either of two shoulders 114,116 that are positioned on opposite sides of the plate member 104. A second end portion 118 of the plate member 104 is secured to the second tilt lever 58 by a threaded fastening member 120, such as a bolt, that extends through the plate member and is received in a threaded aperture 122 in the second tilt lever 58.

Industrial Applicability

In operation of the loader linkage 10 of the vehicle 12, the bucket 24, in the position shown in FIG. 1, is moved by the vehicle 12 into a pile of material (not shown) to fill the bucket. The vehicle is then maneuvered along side the bed of a truck or hopper, to dump the contents of the bucket 24. The lift arms 14 are then vertically raised to position the bucket above the side of the truck by actuation of the hydraulic lift cylinder 28. With the bucket positioned over the bed of the truck, the hydraulic tilt cylinder 46 is retracted to initiate the dumping process. With the retraction of the cylinder 46, the power levers 36 are rotated with respect to the lift arms 14 in a clockwise or forward direction as viewed in FIG. 1. With the rotation of the power levers, the tilt lever assemblies 38 are also rotated in a clockwise direction since they are connected to the power levers 36 by power links 52. As the first and second tilt levers 56 and 58 of the tilt lever assemblies rotate, the bearing 102 accomodates the relative movement between the pin 86 and the bore 92 in the lift arm 14. However, since the pin 86 is attached to first tilt lever 56 and rotates with the tilt lever assembly, a relatively large clearance is permitted and therefore no bearing is needed between the pin 86 and the bore 88 in the first tilt lever 56. Similarly, since the first tilt lever 56 moves very little with respect to the second tilt lever 58, a relatively large clearance also exists between the pin 86 and the bore 89, which also requires no bearing.

During the normal rotation of the tilt lever assemblies 38 with respect to the lift arms 14, the axial positioning of the first and second tilt levers 56 and 58 with respect to the lift arms 14 along the common axis X, is maintained by plate member 104. Since the first end portion 106 of the plate member 104 is positioned within the groove 110, between the shoulders 114 and 116 of the pin 86, axial movement of the tilt levers with respect to the lift arm is limited in both directions.

The tilt lever assemblies 38 will continue to rotate until the flat position 74 of the first and second tilt levers 56 and 58 engage the corresponding stop members 80 positioned on the respective first and second sides 64 and 66 of the lift arm 14. Since the first and second tilt levers 56 and 58 are not connected to each other by means other than the mounting apparatus 62 on the first and second end portions 60,61 and 68,69 respectively, they are allowed limited relative rotation with respect to each other about mounting apparatus 62. If by some reason, during manufacturing or assembly, the dump stop members 80 are not precisely positioned, the first and second tilt levers 56 and 58 will still properly rest upon the respective stop member to accept a full share of the loading.

Thus it can be seen from the foregoing description that the arrangement between the lift arms 14 and the tilt lever assemblies 38 utilizes a mounting apparatus 62 that mounts the components of the linkage together for relative rotation therebetween. And, since the mounting apparatus 62 has the means 82 thereof secured to and rotating with one of the first and second tilt levers 56 and 58, no bearing or lubrication means is required between the first and second tilt levers and the mounting member such as pin 86. Likewise, the axial movement between the first and second tilt levers 56 and 58 and the lift arm 14 is controlled by a single member 86 that is mounted to the other of the first and second tilt levers also requiring no bearing or lubrication. With such an apparatus, the linkage arrangement 10 consists of an extremely simple and economical arrangement that is very easily maintained. Also, the linkage arrangement 10 assures that loads applied thereto will be evenly distributed to provide extended life of the associated components.

Other aspects, objects and advantages of this invention can be obtained from a study of the drawings, the disclosure and the appended claims.

I claim:

1. A mounting apparatus for a linkage arrangement adapted to be supported on an elongated support arm, having at least one bearing bore defined therethrough along an axis, comprising:

a pair of first and second elongated, laterally spaced tilt levers disposed in embracing relation to said support arm and having bore therethrough alignable with the bearing bore along said axis;

means for mounting the tilt levers to the support arm for relative rotation therewith about said axis, said means being snuggly journalled in said bearing bore and more loosely extendable through the bores in the tilt levers and being coupled to one of the tilt levers for rotation therewith; and means for limiting the axial movement of said tilt levers along said axis while permitting limited rotation between said levers, said limiting means being coupled to the other of said levers for rotation therewith.

2. The mounting apparatus as set forth in claim 1 wherein the mounting means includes:

a pin having a first and second end portion, said second end portion having an annular groove defined therearound;

a flange member having a first end portion secured to the first end portion of the pin and a second end portion extending laterally from the pin in a direction normal to said axis; and means for fastening the flange member to the first lever and thereby securing the pin to the first lever for rotation therewith.

3. The mounting apparatus as set forth in claim 2 wherein said limiting means includes:

a plate member having a first and second end portion, said first end portion engaging the groove formed in said pin; and means for fastening the plate member to the second lever in a manner to permit relative rotation between said plate member and said pin.

4. The mounting apparatus as set forth in claim 1 wherein the support arm is a lift arm of a loader-type linkage arrangement for a construction vehicle, said lift arm having a work implement rotatably mounted on one end thereof.

5. The mounting apparatus as set forth in claim 4 wherein the first and second levers comprise a tilt lever assembly that is connected to each lift arm to form a portion of a tilting apparatus that is associated with the work implement.

6. The mounting apparatus as set forth in claim 5 wherein the tilting apparatus also includes a pair of tilt links that extend between the tilt lever assemblies and the work implement to cause the rotation of the work implement with respect to the lift arm upon movement of the tilt lever assemblies.

7. The mounting apparatus of claim 1 wherein a bearing member is positioned within the bearing bore of the support arm to accomodate relative rotation of the pin with respect to the support arm.

8. A mounting apparatus for operatively attaching a work implement to a vehicle, comprising:

a pair of lift arms having a first end portion connected to the vehicle and a second end portion rotatably secured to the work implement, said lift arms having a bearing bore positioned along an axis extending transversely therethrough intermediate said end portions;

a first and second tilt lever associated with each lift arm and having first and second end portions and a bore defined in each of said first end portions, said tilt levers being positioned along said axis with the first end portions of the tilt levers on opposite sides of each of the lift arms with the bores of the first end portions of the tilt levers in alignment with the bore of the lift arm;

means for mounting the first and second tilt levers to the lift-arms for relative rotation with respect thereto about said axis, said means being snuggly journalled in said bearing bore and more loosely received within the bores defined in the first end portions of the tilt levers and being coupled to one of said first and second tilt levers for relative rotation therewith; and means for maintaining the axial positioning between the first and second tilt levers and the lift arm along said axis, said means being coupled to the other of the first and second tilt levers for rotation therewith.

9. The mounting apparatus as set forth in claim 8 wherein a pair of tilt links extend between the second end portions of the first and second tilt levers and the work implement.

10. The mounting apparatus as set forth in claim 9 wherein an actuator is engageable with the first and second tilt levers to cause rotation thereof with respect to the lift arms and thus the rotation of the work implement with respect to the lift arm.

11. The mounting apparatus as set forth in claim 8 wherein said mounting means further includes:

a pin member having a first end portion and a second end portion, said second end portion defining an annular groove therearound; and a flange member having a first end portion secured to the first end portion of the pin member and a second end portion extending in a direction normal to an axis of the pin.

12. The mounting apparatus as set forth in claim 8 wherein said axial positioning means includes a plate member having a first and a second end portion, said first end portion defining a generally concave indentation thereon.

13. The mounting apparatus as set forth in claim 11 wherein a bearing member is positioned between the pin member and the bore of the lift arm to accomodate relative rotation between the pin and the lift arm.

14. The mounting apparatus as set forth in claim 11 wherein a fastening member is engaged with the second end portion of the flange member to secure the flange member to the first tilt lever so that the pin member and the first tilt lever rotate together in response to movement of said actuator.

15. The mounting apparatus as set forth in claim 14 wherein a fastening member is engaged with the second end portion of the plate member to secure the plate member to the second tilt lever with the first end portion of said plate member positioned within the groove of the pin member to limit the axial movement of the first and second tilt levers with respect to the lift arm.

* * * * *